United States Patent
Lakshmanamurthy et al.

(10) Patent No.: US 7,360,031 B2
(45) Date of Patent: Apr. 15, 2008

(54) METHOD AND APPARATUS TO ENABLE I/O AGENTS TO PERFORM ATOMIC OPERATIONS IN SHARED, COHERENT MEMORY SPACES

(75) Inventors: Sridhar Lakshmanamurthy, Sunnyvale, CA (US); Mason B. Cabot, San Francisco, CA (US); Sameer Nanavati, Fremont, CA (US); Mark Rosenbluth, Uxbridge, MA (US)

(73) Assignee: Intel Corporation, Santa Clara, CA (US)

( * ) Notice: Subject to any disclaimer, the term of this patent is extended or adjusted under 35 U.S.C. 154(b) by 276 days.

(21) Appl. No.: 11/171,155

(22) Filed: Jun. 29, 2005

(65) Prior Publication Data

US 2007/0005908 A1    Jan. 4, 2007

(51) Int. Cl.
*G06F 12/02* (2006.01)
(52) U.S. Cl. ............... 711/141; 711/142; 711/134; 711/144; 711/145; 711/146
(58) Field of Classification Search ............ 711/141
See application file for complete search history.

(56) References Cited

U.S. PATENT DOCUMENTS

| | | | |
|---|---|---|---|
| 6,163,764 A * | 12/2000 | Dulong et al. ............... | 703/26 |
| 7,194,586 B2 * | 3/2007 | Brown et al. ............... | 711/144 |
| 2002/0087807 A1 * | 7/2002 | Characharloo et al. ..... | 711/141 |
| 2003/0097529 A1 * | 5/2003 | Arimilli et al. ............. | 711/141 |

\* cited by examiner

*Primary Examiner*—Hyung S. Sough
*Assistant Examiner*—Hamdy S Ahmed
(74) *Attorney, Agent, or Firm*—Blakely, Sokoloff, Taylor & Zafman LLP

(57) ABSTRACT

Method and apparatus to enable I/O agents to perform atomic operations in shared, coherent memory spaces. The apparatus includes an arbitration unit, a host interface unit, and a memory interface unit. The arbitration unit provides an interface to one or more I/O agents that issue atomic transactions to access and/or modify data stored in a shared memory space accessed via the memory interface unit. The host interface unit interfaces to a front-side bus (FSB) to which one or more processors may be coupled. In response to an atomic transaction issued by an I/O agent, the transaction is forked into two interdependent processes. Under one process, an inbound write transaction is injected into the host interface unit, which then drives the FSB to cause the processor(s) to perform a cache snoop. At the same time, an inbound read transaction is injected into the memory interface unit, which retrieves a copy of the data from the shared memory space. If the cache snoop identifies a modified cache line, a copy of that cache line is returned to the I/O agent; otherwise, the copy of the data retrieved from the shared memory space is returned.

22 Claims, 6 Drawing Sheets

METHOD AND APPARATUS TO ENABLE I/O AGENTS TO PERFORM ATOMIC OPERATIONS IN SHARED, COHERENT MEMORY SPACES

FIELD OF THE INVENTION

The field of invention relates generally to computer systems and, more specifically but not exclusively relates to techniques for enabling I/O agents to perform atomic operations in shared, coherent memory spaces.

BACKGROUND INFORMATION

Under a coherent memory architecture, all components in a computing system are assured access to the same data values. Memory coherency ensures that data being moved into or out of memory does not appear to have different values when accessed by processors or other components that access shared memory resources. Under the simplest approach, there is only one copy of any particular data at any time in the entire system, and only one component may access that data at one time. While this scheme guarantees memory coherency, it does not permit memory caching, which is common to modern processor architectures. Since memory caching involves making at least one copy of data stored in system memory and then allowing that copy to be modified outside of system memory, there needs to be a mechanism to ensure that only a valid version of a given piece of data may be accessed. This problem is easily solved for a single-processor system by using one of several well-known memory and cache coherency schemes that are managed by the processor and/or memory controller.

The memory coherency problem becomes more complex in multiprocessor architectures that share a common memory space. Since each processor has its own cache, there needs to be a mechanism to ensure only coherent atomic memory transactions may be performed, and that there is only one valid copy of a given piece of data at a time. For symmetric agents, such an Intel® 32-bit architecture (IA-32) processors, a bus read-for-ownership transaction is employed to access a memory location, which invalidates all cache lines corresponding to that memory location in other processor caches. This allows the symmetric agent to perform an atomic operation on that memory location, while preventing other symmetric agents from accessing the data until it is written back into its original location in the shared memory and marked as accessible. The IA-64 architecture (e.g., Intel® Itanium® processor) adds to this the concept of guaranteeing cache line ownership. By asserting the OWN# signal during a transaction, an Itanium® processor may instruct the memory controller to ignore memory updates due to an implicit write-back in response to the bus read-for-ownership. In doing this, the Itanium® processor has informed the memory controller that the memory controller does not need to write back the dirty data to memory: the processor guarantees that it will claim the dirty data, modify it as needed, and write the data back to memory at some later time. In an Itanium-based system, only the processors (i.e., symmetric agents), have the ability to assert OWN# and claim ownership for a cache line.

In recent years, higher and higher performance networking equipment has become available. For example, it is now common for business networks and even some home networks to employ 1 Gigabit per second Ethernet (1 GbE) connections. Even higher data rates are envisioned for the future. In order to support such high data rates, the use of dedicated input/output (I/O) agents has been introduced. By handling network communication operations that would typically be performed by a communications software stack (e.g., TCP/IP protocols) running on a processor, these I/O agents enable much of the communication workload for a computer system to be off-loaded from the processor, freeing it up to perform other tasks. In addition, next-generation I/O agents will integrate specialized network protocols and security acceleration in dedicated off-load units.

Currently, many modern computer architectures do not provide a mechanism for an I/O agent to guarantee the atomicity of a transaction within a shared, coherent memory space. This limits the flexibility of architectures that employ I/O agents, requiring either memory segmentation to be employed (e.g., the processors and I/O agents access separate memory spaces), or requiring access to shared memory resources to be routed through the processors at some level. Systems employing these I/O agents would significantly benefit from the ability for I/O agents to perform atomic operations in coherent shared memory spaces in a manner that is similar to that supported by today's processors.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus to enable I/O agents to perform atomic transactions in shared, coherent memory spaces are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the present invention now described extend the concept of cache line ownership in general-purpose processors and memory controller system by giving an I/O agent, i.e., the priority agent, the ability to guarantee cache line ownership during an I/O atomic operation. Such cache line ownership enables the I/O agent to perform atomic transactions on data in shared memory spaces while ensuring memory coherency. At the same time, mechanisms are provided to identify atomic transactions, enforce coherency with processor caches, and enforce atomicity through the completion of the operation by the I/O agent.

Figure 1:
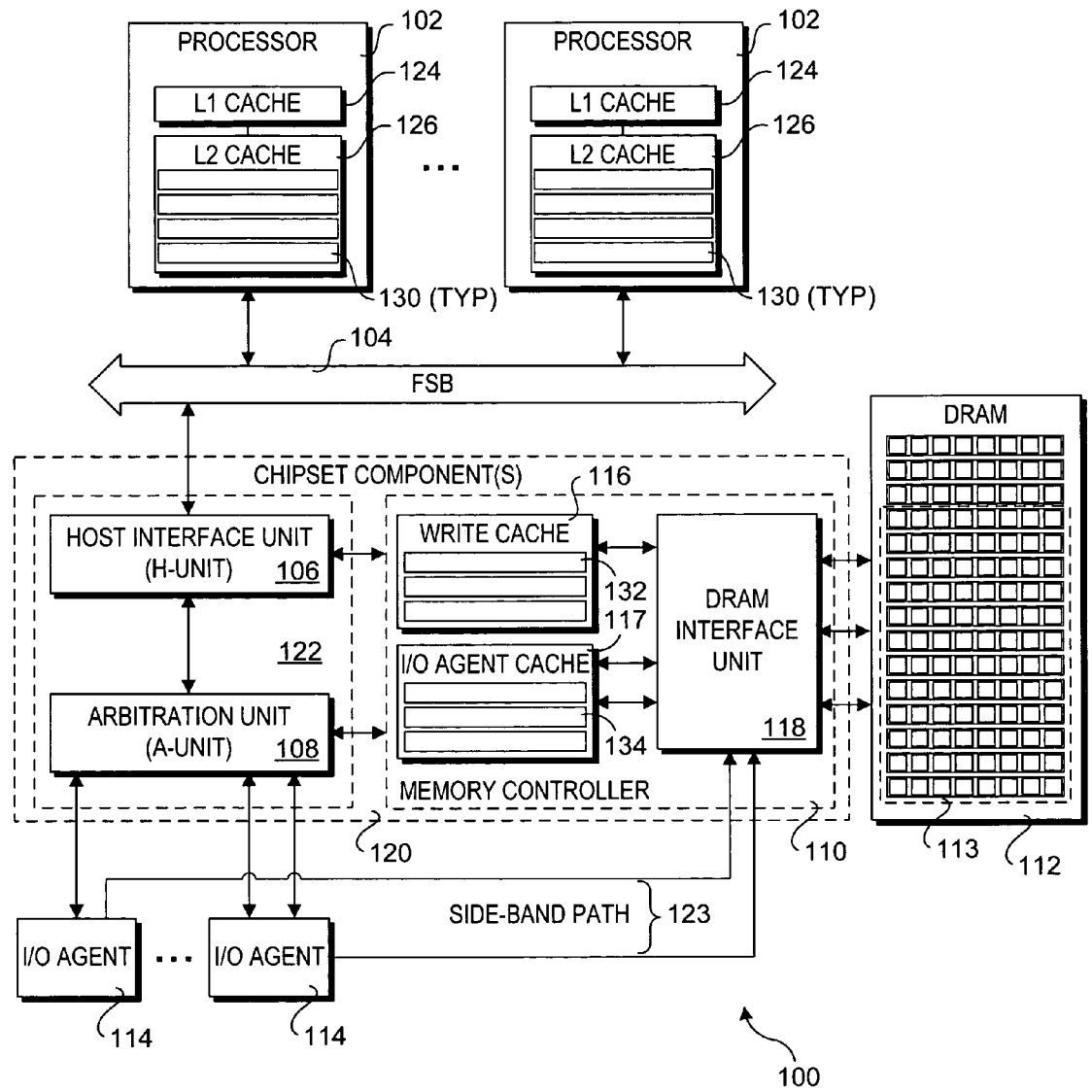
FIG. 1 is a schematic diagram of a system architecture including one or more chipset components that are used to enable I/O agents to perform atomic transactions on data in a shared memory space access via the chipset, according to one embodiment of the invention.

FIG. 1 shows an architecture 100 in accordance with one embodiment of the invention that enables I/O agents to perform atomic operations in a shared, coherent memory space. Architecture 100 includes one or more processors 102, a front-side bus 104, a host interface unit (H-unit) 106, an arbitration unit (A-unit) 108, a memory controller 110, system memory comprising a DRAM (dynamic random access memory) store 112, and one or more I/O agents 114. Each of the processors 102 and host interface unit 106 are communicatively-coupled (hereafter "coupled") to FSB 104. The arbitration unit 108 is coupled to the host interface unit 107, while each of these units are coupled to memory controller 110, which in turn is coupled to DRAM store 112. In one embodiment, memory controller 110 includes a write cache 116, an I/O agent cache 117 and a DRAM interface unit 118 to support memory access to DRAM store 112. In another embodiment, a single cache is employed to support the functionality of both write cache 116 and I/O agent cache 117 discussed herein. Each of I/O agents 114 is coupled to A-unit 108. In one embodiment, as illustrated, each of I/O agents 114 is also directly coupled to DRAM interface unit 118 via a side-band path 123.

The various functional blocks depicted as H-unit 106, A-unit 108, write cache 116, I/O agent cache 117, and DRAM interface unit 118 may generally be packaged individually, or combined as one or more chipset components, as depicted by the various dashed outlines in FIG. 1. For example, all of these components may be combined onto a single chipset component 120 in one embodiment. In another embodiment, H-unit 106 and A-unit 108 are combined on a first chipset component 122 that interfaces to memory controller 110, which comprises a second chipset component.

Each of processors 102 is depicted as including a level-1 (L1) cache 124 and a level-2 (L2) cache 126. Under optional configurations, a processor may include only an L1 cache, or it may support additional cache levels, such as an L3 cache or an eviction cache that sits between the L1 and L2 caches. L1 caches will typically be implemented "on die" (i.e., sharing the same die as the processor's core components), while L2 caches may be implemented either on die or in a separate die that is either packaged within the same package as the processor (i.e., "on-chip") or in a separate package ("off-chip"). Eviction caches are typically implemented either on-die or on-chip, while L3 caches, if employed, are typically on-chip or off-chip.

DRAM store 112 represents "system" or "main" memory for a typical computer system. In practice, DRAM store 112 will comprise one or more blocks of memory on one or more physical devices, such as SIMMs (single in-line memory modules) or other types of modern DRAM packages. The system memory will be mapped to a memory space that employs either physical or virtual addressing, depending on the processor architecture. As depicted in the Figures herein, a portion of the memory address space within the dashed box comprises shared memory space 113.

Each of L2 caches 126 is shown as including multiple cache lines 130. Likewise, each of write cache 116 and I/O agent cache 117 include multiple cache lines 132 and 134. Each cache line contains data corresponding to an associated memory block in the shared memory space hosted by DRAM store 112.

Under the processes illustrated herein, an I/O agent performs an atomic transaction to access and/or modify data stored in shared memory space 113. When an IO agent intends to perform an atomic operation on a shared memory location in coherent memory space, it must first acquire exclusive ownership for that location. The IO agent must then hold on to ownership for that location until the entire atomic sequence is complete and guarantee that no other agent gains access to that location prior to the completion of the atomic operation. Once the atomic update is done, the IO agent must relinquish ownership such that other agents in the system can acquire ownership to that memory location.

Figure 2:
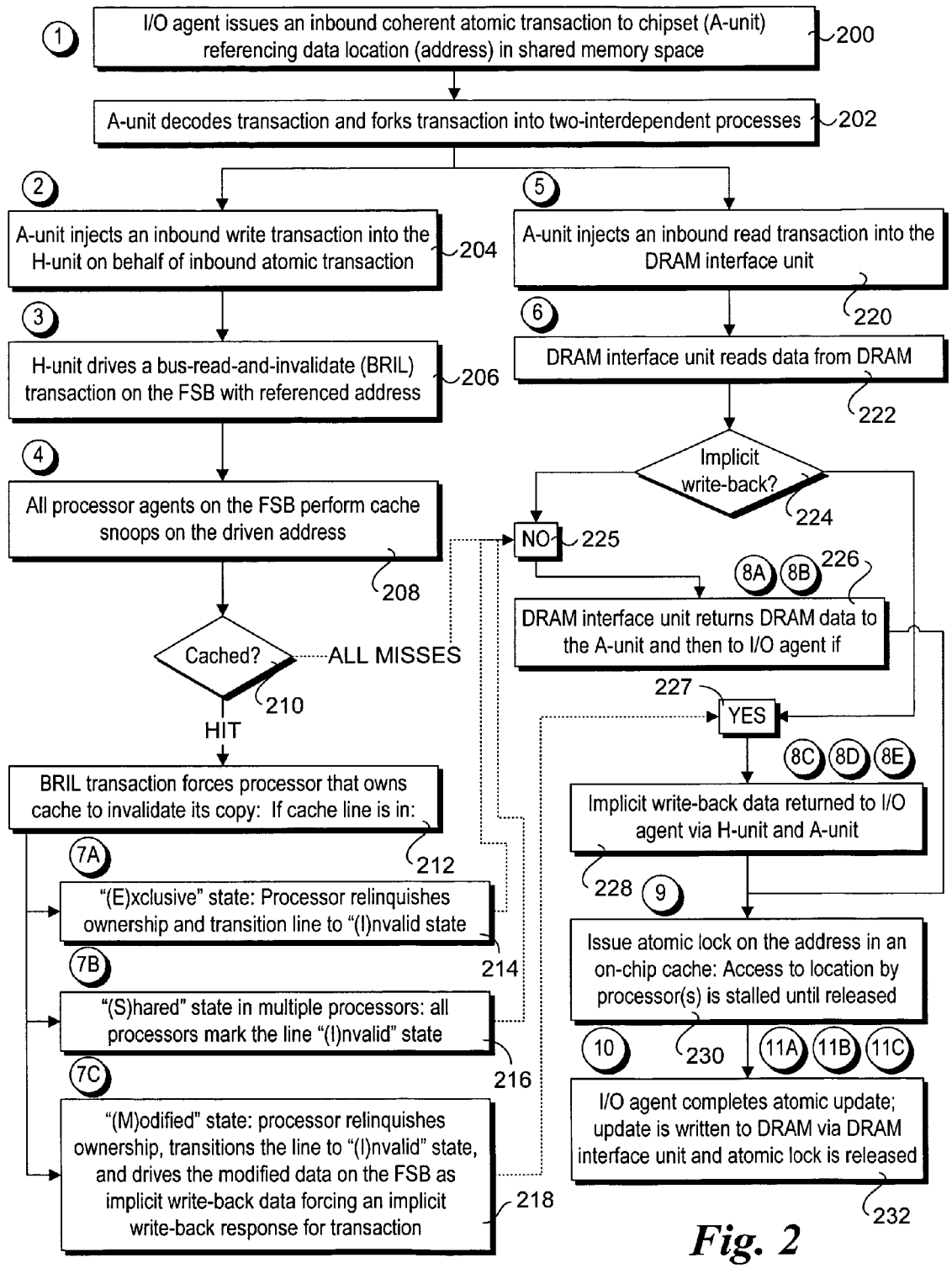
FIG. 2 is a flowchart illustrating operations performed in response to an inbound coherent atomic transaction issued by an I/O agent, wherein the transaction is forked into two inter-dependent processes.
Figure 3:
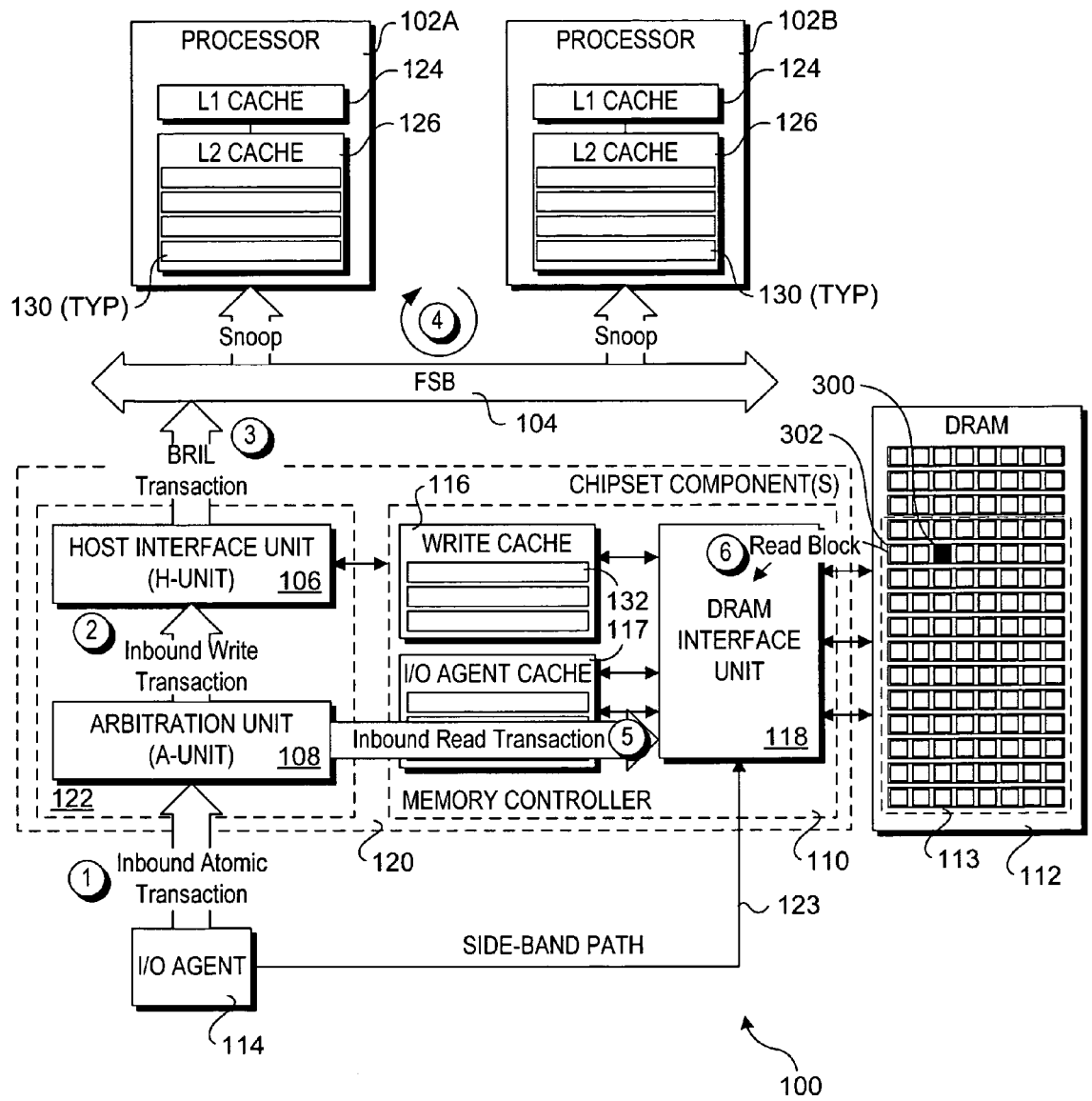
FIG. 3 is a schematic diagram illustrating a first portion of message and data flows corresponding to the two inter-dependent processes.

With reference to the flowchart of FIG. 2 and the schematic diagram of FIG. 3, the various components of architecture 100 perform the following operations and logic to enable I/O agents 114 to perform atomic transactions on share memory space 113 hosted by DRAM store 112. For convenience and clarity, each of FIG. 2 and FIGS. 3, 3a, 3b, and 3c include encircled numbers so that operations in the flowchart can be matched with corresponding operations and data/message flows performed by the various components of architecture 100. This encircled numbers are alternatively referred to as "operations" in the following description. Although the encircled numbers are sequentially ordered, this does not imply that the corresponding operations are entirely performed in the same sequence. Rather, as will become apparent, some of the operations are performed concurrently.

The process begins in a block 200, wherein an I/O agent 114 issues an inbound coherent atomic transaction to arbitration unit 108 (or otherwise to a chipset component including the arbitration unit) referencing a location (memory address) of data 300 in shared memory space 113. This operation is shown as operation 1 in FIG. 3. In response to receiving the transaction, A-unit 108 decodes the transaction and forks it into two inter-dependent processes, as depicted in a block 202 and schematically depicted in FIG. 3.

In accordance with a first transaction fork depicted on the left-hand column of FIG. 2 and beginning at a block 204, A-unit 108 injects an inbound write transaction into the H-unit on behalf of the inbound atomic transaction, as shown at operation 2 in FIG. 3. Next, at a block 206 and operation 3, H-unit 106 drives a bus-read-and-invalidate (BRIL) transaction on FSB 104 with the referenced address for data 300. In response to the BRIL transaction, all of the processor agents perform a cache snoop of their respective caches to see if the driven address is contained in any of their cache lines, as depicted in a block 208 and operation 4. This snooping operation is performed using well-known techniques and is a built-in processor feature. In the illustrated example of FIG. 3, the cache snoop is performed by each of processors 102A and 102B.

As discussed above, the original transaction is forked at block 202. As a result, the operations described in blocks 220 and 222 and shown as operations 5 and 6 in FIG. 3 are performed substantially concurrent with operations 24. First, in block 220, A-unit 108 injects an inbound read transaction into DRAM interface unit 118. In response, the DRAM interface unit reads a memory block containing the data at the referenced address of the original inbound atomic transaction from shared memory space 113.

Returning to the first fork at a decision block 210, a determination is made to whether any of the processor cache snoops results in a cache hit, indicating that a modified or unmodified copy of data 300 is present in one of the processor caches (e.g., L2 cache 126) for each of processors 102A and 102B. If a cache hit results, the logic proceeds to a block 212, wherein the BRIL transaction forces the processor that owns the cache line to invalidate its copy.

In one embodiment, cache coherency is facilitated by an implementation of the MESI (Modified Exclusive Shared Invalid) protocol. The MESI protocol is a formal mechanism for employing cache coherency via snooping, and is particularly useful in multiprocessor architectures. Under the MESI protocol, each cache line is assigned one of four MESI states.

A (M)odified-state line is available in only one cache and it also contains data that has been modified—that is, the data is different than the data at the same address in system memory.

An (E)xclusive-state line is also available to only one cache in the system, but the line is not modified (and thus the data in cache and the data in system memory are identical). A write to an E-state line causes the line to become modified.

A (S)hared-state line indicates that the line is potentially shared with other caches (i.e., the same line may exist in more than one cache). A read to an S-state line does not generate bus activity, but a write to a Shared line generates a write-through cycle on the bus. This may invalidate this line in other caches. A write to an S-state line updates the cache. Under one configuration, Writes to S-state lines will cause the bus to issue a Read For Ownership (RFO, zero-byte read) which will cause other caches to invalidate the line and transition this line to the Exclusive state. The write may then proceed to the E state line as described above.

An (I)nvalid-state indicates that the line is not available in the cache. A read to this line will result in a MISS and may cause the processor (under normal processor-initiated operations) to execute a line fill (fetch the line from a corresponding block in system memory). In one embodiment, a write to an Invalid line causes the processor to execute a write-through cycle to the bus. In one embodiment, a write to an "I" state line in write-back memory will cause a memory read on the bus to allocate the line in the cache. This is an "allocate on write" policy.

Figure 3A:
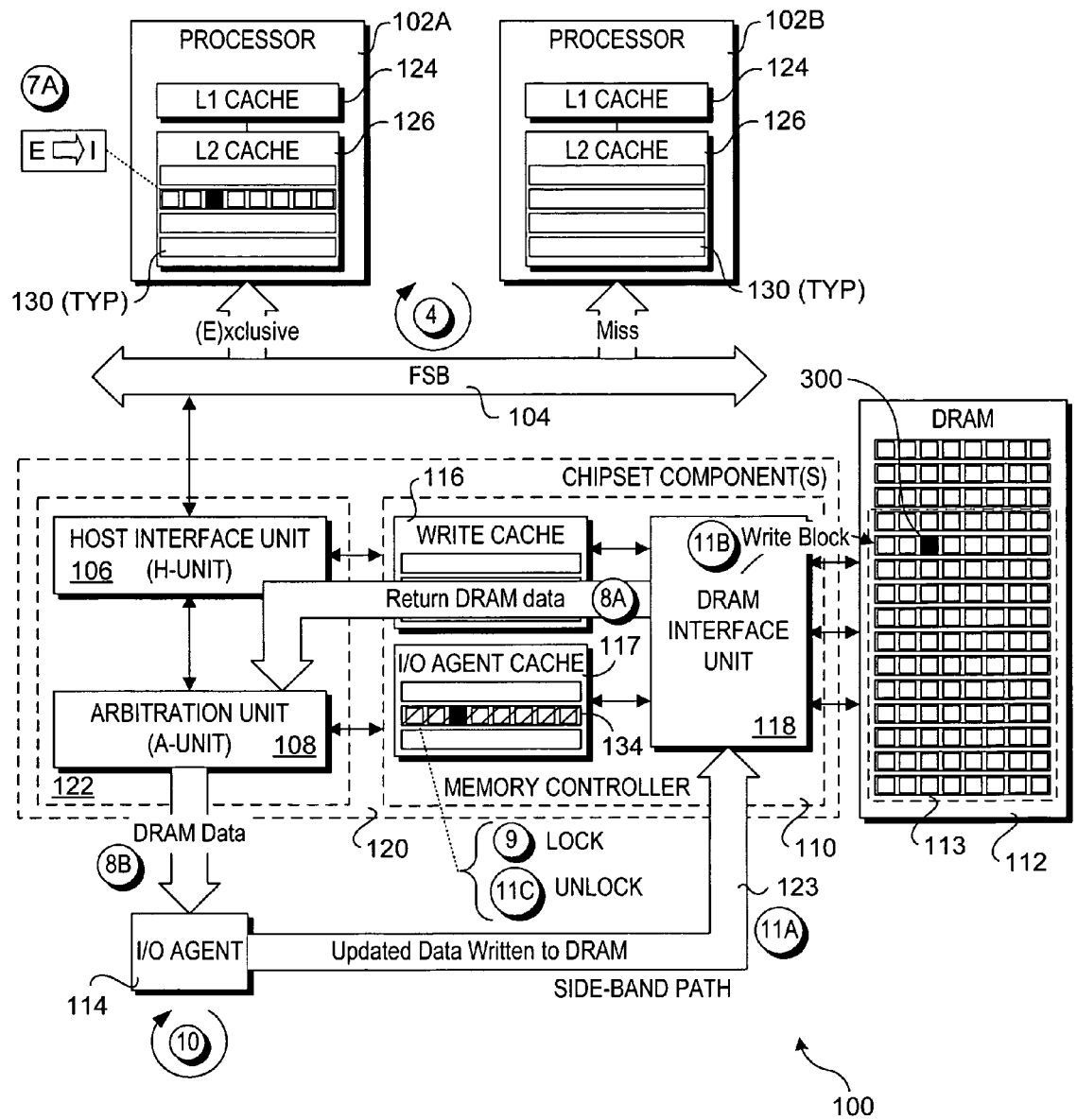
FIG. 3a is a schematic diagram illustrating a second portion of message and data flows corresponding to the two inter-dependent processes under which a processor snoop identifies the existence of a cache line in an Exclusive state.

As respectively shown in blocks 214, 216, and 218, the state of a cache line identified by a cache snoop that produces a hit will be either (E)xclusive, (S)hared, or (M)odified. The resultant data flow and operations for an Exclusive state is shown in FIG. 3a. As shown in block 214, in response to identifying a cache line corresponding to the data address having an Exclusive state, the corresponding processor relinquishes ownership of that cache line and transitions the state to Invalid. In the example of FIG. 3a, an exclusive copy of data 300 is present in a cache line 302 in the L2 cache 126 of processor 102A.

As indicated by a decision block 224, operations 8A and 8B of a block 226 will be performed if an implicit write-back is not generated, while operations 8C, 8D, and 8E of a block 228 will be performed if an implicit write-back is generated as the result of the foregoing BRIL transaction and subsequent snoop operations. As depicted by the dotted lines flowing into a NO block 225, the cache snoop results in anything other than a cache line hit with a Modified state, no implicit write-back will occur, which is the case for the Exclusive state result of FIG. 3a. Accordingly, in block 226 DRAM interface unit 118 returns the DRAM data read in block 222 to I/O agent 114 via A-unit 108. In conjunction with this data transfer, in a block 230 an atomic lock is place on a cache line in an on-chip cache (operation 9), such as depicted by cache line 134 in I/O agent cache 117. This cache line lock prevents other agents, such as processors 102A and 102B (as well as other I/O agents not shown), from accessing any data in this cache line, including data 300. Thus, this cache-line locking mechanisms enables an I/O agent 114 to gain exclusive ownership of cache line 134.

Figure 3B:
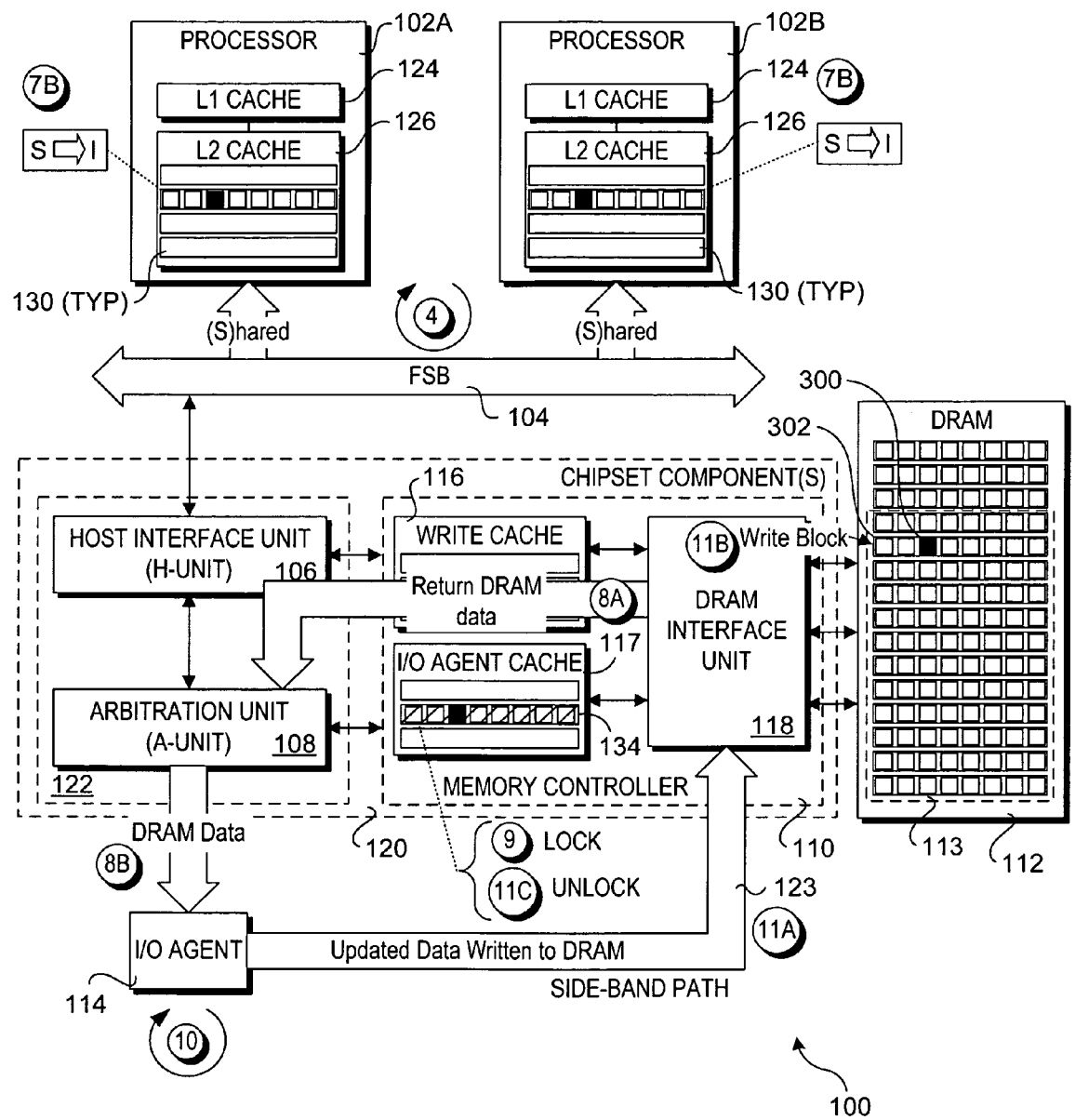
FIG. 3b is a schematic diagram illustrating a second portion of message and data flows corresponding to the two inter-dependent processes under which a processor snoop identifies the existence of multiple cache lines in a Shared state.
Figure 3C:
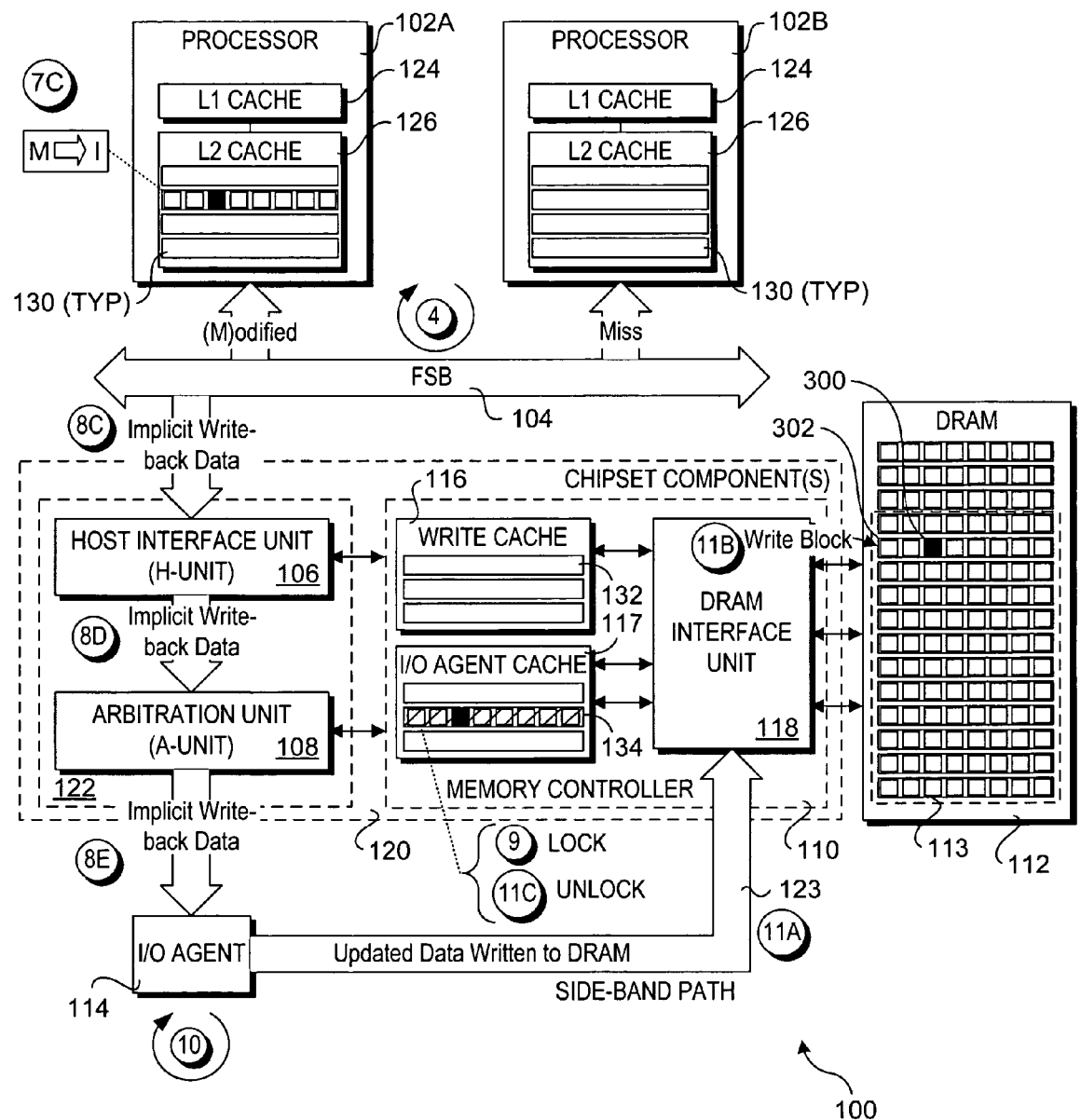
FIG. 3c is a schematic diagram illustrating a second portion of message and data flows corresponding to the two inter-dependent processes under which a processor snoop identifies the existence of a cache line in a Modified state.

At this point, the I/O agent may perform its atomic update, as depicted as an operation 10 in each of FIGS. 3a, 3b, and 3c and in a block 232. At the completion of the atomic update, a copy of the updated data is written to data 300 in shared memory space 113 by sending a data write request directly to DRAM interface unit 118 via side-band path 123, as depicted by operations 11A and 11B, and the atomic lock on cache line 134 is released in accordance with operation 11C. This completes the atomic transaction. Under a typical scenario, the DRAM interface unit will write a new cache line in write cache 116 with the updated data and then this write cache line will be written to replace the memory block containing data 300 in shared memory space 113 using an asynchronous write operation. However, for simplicity, FIG. 3a shows DRAM interface unit 118 writing the cache line directly to DRAM store 112.

The dataflows and operations for a cache snoop resulting in one or more Shared states are shown in FIG. 3b. In the illustrated example, a shared copy of data 300 is present in a respective cache line in the L2 caches for each of processors 102A and 102B. As depicted in block 216, the Shared state in these multiple processors is marked as Invalid, thus invalidating the copies of data 300 in these cache lines. Subsequently, the remaining operations corresponding to the atomic transaction are the same as described above for the Exclusive state example of FIG. 3a.

Referring now to FIG. 3c, the result of a cache snoop yielding a cache line with a Modified state proceeds as follows. Recall that a cache line with a Modified state means that some data in the cache line has been modified. As a result, the data in the Modified cache line no longer matches the original data (memory block) that was cached from the system memory. Under this situation, there will be a need to update the system memory to reflect the data change. It is noted that the modified data may include data 300 or may not—the Modified state only identifies that at least some portion of data in the cache line has been changed.

As shown in block 218, in response to identifying a cache line with a Modified state, the corresponding processor (102A in the example of FIG. 3c) relinquishes ownership of the cache line by transitioning its state to Invalid, and then drives the modified cache line onto FSB 104 as implicit write-back data forcing an implicit write-back response for the transaction. As a result of this implicit write-back, the result of decision block 224 is YES, as shown by a YES block 227. Thus, the logic proceeds to block 228 to perform operations 8C, 8D, and 8E. These operations include returning the implicit write-back data to I/O agent 114 via H-unit 106 and A-unit 108. As before, in conjunction with this data transfer, a cache line 134 corresponding to the write-back data is written to I/O agent cache 117, and a lock is placed on the cache line such that I/O agent 114 gains exclusive ownership of the cache line. Subsequently, the I/O agent will complete its atomic update, and then send a request via side-band path 123 to DRAM Interface unit 118 to update the copy of data 300 in system memory (as well as update the rest of the memory block containing data 300).

As discussed above, a single cache (referred to below as a combination cache) may be used to facilitate the operations described for both write cache 116 and I/O cache 117. In one embodiment, the functionality of a conventional write cache is extended by providing a flag or the like to indicate that a given cache line is locked, meaning the data in that cache line is (1) not to be provided to a subsequent requester, such as processor or I/O agent; and (2) the data is not to be written back into the system memory as would normally be performed with cache lines in a conventional write cache.

In further detail, under a conventional write cache architecture when a request for data is received from a requester, the memory controller first checks to see if an updated copy of the data is present in the write cache but as yet to be written back to the system memory. Rather than return the (now) invalid copy from system memory, the memory controller returns the copy of the data in the write cache (along with the rest of the data in the cache line). The combination write/I/O cache performs this operation in the conventional manner.

However, the I/O cache aspects of this combination cache behaves in a different manner. During an atomic I/O transaction, a copy of the requested data is either returned from one of the processor caches (if a snoop identifies a modified cache line containing the data referenced by the transaction) or from the shared memory space. In conjunction with this operation, a corresponding cache line is written to the combination cache, and it is marked as being locked. This time, in response to a subsequent access request while the lock is on, the memory controller determines that the requested data is locked, returning a locked status to the requester. In one embodiment, the requester then will continue to resubmit the request to the memory controller using polling. In another embodiment, the memory controller provides a mechanism to identify a first requester that is denied from accessing a locked cache line, and subsequently, upon release of the lock by the I/O agent, provides the requested cache line to the previously-blocked requester.

In one embodiment, I/O agent cache 117 is implemented as a CAM (content addressable memory) that need not store any cache line data. For example, the purpose of the atomic lock is to prevent another agent from accessing data that is already being operated on by an I/O agent. As a result, there is no need to cache the same copy of that data at another location. Thus, to facilitate the lock function, the CAM merely needs to store the starting addresses of the memory blocks (and equivalent cache lines) being locked. Accordingly, if an incoming request is received referencing data stored in a memory block that is locked, the corresponding CAM lookup will result in a hit. If the CAM lookup results in a miss, the memory block containing the data is not locked, and a copy of that memory block is simply retrieved from shared memory space 113 to service the request.

In general the operations and logic described above with reference to FIGS. 2, 3, and 3a-c may be implemented via programmed logic in appropriate architecture units. For example, the operations performed by A-unit 108 may be implemented using programmed logic using well-known techniques. Under various embodiments, the programmed logic may be implemented at the hardware level, via embedded software, or a combination of the two. For example, hardware level logic may be employed using logic cells and the like, while embedded software implementations may employ microcode or firmware running on one or more execution cores.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
receiving a data access request from an input/output (I/O) agent coupled to a memory control mechanism via a first interface, the data access request identifying an address of data stored in a shared memory space memory space that is also accessible to at least one processor having at least one cache via a second interface of the memory control mechanism;
forking the data access request into two paths to perform respective sets of inter-dependent operations, wherein the first set of inter-dependent operations includes causing the at least one processor to perform a cache snoop to determine if a copy of the data is present in its cache, wherein the second set of inter-dependent operations includes issuing an read transaction to a memory controller, the read transaction referencing the address of the data; and
performing a coherent atomic transaction on the data.

2. The method of claim 1, further comprising:
transferring a copy of a memory block including the data from the shared memory space to the I/O agent;
performing a lock on the memory block;
receiving an updated version of the data from the I/O agent;
writing the updated copy of the data back to the memory block in the shared memory space; and
removing the lock on the memory block.

3. The method of claim 2, wherein the operation of performing the lock on the memory block comprises:
storing information identifying the memory block on a memory controller; and
storing indicia identifying the memory block is locked.

4. The method of claim 3, wherein the operation of performing the lock on the memory block comprises:
copying the memory block into a cache line in a write cache for the memory controller; and
marking the cache line as locked.

5. The method of claim 3, wherein the operation of performing the lock on the memory block comprises:

copying the memory block into a cache line in an I/O cache for the memory controller; and
marking the cache line as locked.

6. The method of claim 1, further comprising:
determining that at least one processor cache includes a cache line containing an unmodified copy of the data; and
invalidating any cache lines containing a copy of the data.

7. The method of claim 1, further comprising:
determining a modified copy of data is present in a cache line of a processor cache;
relinquishing ownership by the processor of the cache line;
invalidating the cache line;
providing a copy of the modified copy of data to the I/O agent;
enabling the I/O agent to update the modified copy of the data; and
writing the updated copy of the data to the shared memory space.

8. The method of claim 7, further comprising:
performing an implicit write-back on the modified copy of data, the implicit write-back writing a copy of the cache line containing the modified copy of the data into a write cache; and
marking the cache line in the write cache to indicate the cache line is locked.

9. The method of claim 1,
wherein the first set of inter-dependent operations includes,
issuing an inbound write transaction to a host unit of one of a memory controller or chipset component coupled to a memory controller; and
causing each of the at least one processor to perform a cache snoop to determine if a copy of the data is present in its cache; and
wherein the second set of inter-dependent operations includes,
issuing an inbound read transaction referencing the address of the data to a DRAM (dynamic random access memory) interface unit of the memory controller; and
retrieving a copy of the data from the shared memory space.

10. The method of claim 9, further comprising:
determining if the cache snoop identifies an existence of a modified copy of the data; and if it does,
returning a copy of a cache line containing the modified copy of the data to the I/O agent; otherwise,
returning the copy of the data retrieved from the shared memory space.

11. The method of claim 9, wherein the at least one processor is coupled to a front-side bus (FSB), and the at least one processor is caused to perform a cache snoop by driving a bus-read-and-invalidate (BRIL) transaction referencing the address of the data on the FSB.

12. An apparatus, comprising:
a memory interface unit, to provide an interface to access a shared memory space;
a host interface unit, coupled to the memory interface unit, to provide an interface via which one or more processors may be operatively coupled to the apparatus; and
an arbitration interface unit, coupled to each of the memory interface unit and the host interface unit, to provide an interface to one or more input/output (I/O) agents,
wherein the apparatus further includes logic implemented in the memory interface unit, host interface unit and arbitration unit to enable the one or more I/O agents to perform a coherent atomic transaction on data stored in the shared memory space by splitting atomic transaction requests received from the I/O agents into two oaths at the arbitration unit to perform respective sets of inter-dependent operations, wherein the first set of inter-dependent operations cause the one or more processors to perform a cache snoop to determine if a copy of the data is present in its cache, wherein the second set of inter-dependent operations includes issuing a read transaction to the memory interface unit referencing an address of the data.

13. The apparatus of claim 12, wherein the apparatus is embodied as a memory controller.

14. The apparatus of claim 12, wherein the apparatus is embodied as a two-component chipset comprising a first component including the host interface unit and the arbitration unit and a second component comprising a memory controller including the memory interface unit.

15. The apparatus of claim 12, further comprising an I/O cache to store information to enable an I/O agent to gain exclusive ownership of a memory block in the shared memory space that includes the data of the coherent atomic transaction.

16. The apparatus of claim 12, further comprising logic to perform operations including:
receiving, at the arbitration unit, an atomic transaction request from an I/O agent, the transaction request identifying an address in the shared memory space of data the I/O agent wishes to modify via an atomic transaction;
issuing an inbound write transaction from the arbitration unit to the host unit;
driving a bus-read-and-invalidate (BRIL) transaction referencing the address of the data onto a front-side bus (FSB) coupled to the host unit to cause each of one or more processors coupled to the FSB to perform a cache snoop to determine if a copy of the data is present in its cache; and
issuing an inbound read transaction referencing the address of the data from the arbitration unit to the memory interface unit; and
retrieving a copy of the data from the shared memory space.

17. The apparatus of claim 16, further comprising logic to perform operations including:
determining if a cache snoop identifies an existence of a modified copy of the data in a processor cache; and if it does,
returning a copy of a cache line containing the modified copy of the data to the I/O agent via the host interface unit and the arbitration unit; otherwise,
returning the copy of the data retrieved from the shared memory space to the I/O agent via the arbitration unit.

18. The apparatus of claim 12, further comprising:
an interface to support a side-band transfer path between an I/O agent and the memory interface unit.

19. A computer system, comprising:
at least one processor, coupled to a front-side bus (FSB);
a dynamic random access memory (DRAM) store;
a memory controller; coupled to the FSB, to provide access to the DRAM store and to partition at least a portion of an address space of the DRAM store into a shared memory space, the memory controller further including an input/output (I/O) agent interface; and at least one I/O agent, operatively coupled to the memory controller via the I/O agent interface, wherein the memory controller further includes logic to enable the I/O agent to perform a coherent atomic transaction on data stored in the shared memory space by splitting atomic transaction requests received from the I/O agents into two paths at the arbitration unit to perform respective sets of inter-dependent operations, wherein the first set of inter-dependent operations cause the at least one processor to perform a cache snoop to determine if a copy of the data is present in its cache, wherein the second set of inter-dependent operations includes issuing a read transaction to the memory controller referencing an address of the data.

20. The computer system of claim 19, wherein the I/O agent comprises a network processor unit.

21. The computer system of claim 19, wherein the at least one processor includes a processor having an IA-32(Intel architecture-32 bits) architecture.

22. The computer system of claim 19, wherein the at least one processor includes a processor having an IA-64(Intel architecture-64 bits) architecture.

* * * * *